United States Patent [19]
Hargis et al.

[11] Patent Number: 5,802,086
[45] Date of Patent: Sep. 1, 1998

[54] SINGLE CAVITY SOLID STATE LASER WITH INTRACAVITY OPTICAL FREQUENCY MIXING

[75] Inventors: David E. Hargis, La Jolla; Maurice A. Pessot, San Diego, both of Calif.

[73] Assignee: Laser Power Corporation, San Diego, Calif.

[21] Appl. No.: 593,094

[22] Filed: Jan. 29, 1996

[51] Int. Cl.$^6$ .................................................. H01S 3/10
[52] U.S. Cl. ................................................. 372/22; 372/23
[58] Field of Search .................................. 372/22, 23

[56] References Cited

U.S. PATENT DOCUMENTS

| | | | |
|---|---|---|---|
| 4,731,787 | 3/1988 | Fran et al. | 372/22 |
| 4,739,507 | 4/1988 | Byer et al. | 372/22 |
| 4,847,851 | 7/1989 | Dixon | 372/75 |
| 4,860,304 | 8/1989 | Mooradian | 372/92 |
| 4,879,723 | 11/1989 | Dixon et al. | 372/21 |
| 4,933,947 | 6/1990 | Anthon et al. | 372/34 |
| 4,942,582 | 7/1990 | Kintz et al. | 372/18 |
| 4,956,843 | 9/1990 | Akhavan-Leilabady et al. | 372/23 |
| 5,142,542 | 8/1992 | Dixon | 372/22 |
| 5,249,192 | 9/1993 | Kuizenga et al. | 372/23 |
| 5,333,142 | 7/1994 | Scheps | 372/23 |
| 5,412,674 | 5/1995 | Scheps | 372/23 |

FOREIGN PATENT DOCUMENTS

| | | | |
|---|---|---|---|
| 5-341393 | 12/1993 | Japan | G03B 27/34 |

OTHER PUBLICATIONS de Barros et al., Two-color Synchronously Mode-locked Femtosecond Ti:Sapphire Laser, *Optics Letters*, vol. 18, No. 8 (1993), pp 631–633, No Month.

Dykaar et al., Sticky Pulses: Two-color Cross-mode-locked Femtosecond Operation of a Single Ti:Sapphire Laser, *Optics Letters*, vol. 18, No. 8 (1993), pp. 634–636, No Month.

Evans et al., Dual-wavelength Self-mode-locked Ti:Sapphire laser, *Optics Letters*, vol. 18, No. 13, (1993), pp. 1074–1076, No Month.

Henderson, A Computational Model of a Dual-wavelength Solid-state Laser, *J. Appl. Phys.*, vol. 68, No. 11 (1990), pp. 5451–5455, No Month.

MacKinnon et al., A Laser Diode Array Pumped, Nd:YVO$_4$/KTP, Composite Material Microchip Laser, *Optics Communications* 105 (1994), pp. 183–187, No Month.

(List continued on next page.)

*Primary Examiner*—Rodney B. Bovernick
*Assistant Examiner*—Robert E. Wise
*Attorney, Agent, or Firm*—Knobbe, Martens, Olson & Bear, LLP

[57] ABSTRACT

A composite cavity continuous wave (cw) microlaser that lases at two fundamental wavelengths, denoted by $\lambda_1$ and $\lambda_2$, which are frequency-mixed in a suitable nonlinear crystal oriented within an optically resonant cavity for phase-matched frequency mixing to generate radiation at a third wavelength. The optically resonant cavity is defined by a first reflective surface and a second reflective surface, both of which are substantially reflective at a first and a second wavelength. A highly absorbing solid-state gain material, preferably Nd:YVO$_4$, which has a first gain transition at the first wavelength and a second gain transition at the second wavelength different from the first wavelength is disposed within the optically resonant cavity. The highly absorbing solid-state gain material is closely coupled to the first reflective surface to promote single mode operation of both fundamental lasing frequencies. An optical pump source is optically coupled through the first reflective face to end-pump the solid-state gain material with continuous pump radiation at a pump wavelength that is highly absorptive by the gain material. In some embodiments, the solid-state gain material has an input face that includes the first reflective surface and the nonlinear crystal has an output face that includes the second reflective surface.

50 Claims, 5 Drawing Sheets

OTHER PUBLICATIONS

Shen et al., Comparison of Simultaneous Multiple Wavelength Lasing in Various Neodymium Host Crystals at Transitions from $^4F_{3/2}-^4I_{11/2}$ and $^4F_{3/2}-^4I_{13/2}$, *Appl. Phys. Lett.*, vol. 56, No. 20 (1990), pp. 1937–1938, No Month.

Shen, Oscillation Condition of Simultaneous Multiple Wavelength Lasing, *Chinese Phys. Lett.* vol. 7, No. 4 (1990) pp. 174–176, No Month.

Shen et al., Twice Sum-frequency Mixing of a Dual-Wavelength Nd:YALO$_3$ Laser to get 413.7-nm Violet Coherent Radiation in LiIO$_3$ Crystal, *J. Appl. Phys.*, vol. 70, No. 3 (1991), pp. 1880–1881, No Month.

Tomaschke, Experimental and Theoretical Study of a Pulsed Dual Frquency Nd:YAG Laser with Intracavity Sum Frequency Mixing, *CLEO* 1990, pp. 252–253, No Month.

Zayhowski, Microchip Lasers, *The Lincoln Laboratory Journal*, vol. 3, No. 3 (1990) pp. 427–445, No Month.

SINGLE CAVITY SOLID STATE LASER WITH INTRACAVITY OPTICAL FREQUENCY MIXING

BACKGROUND OF THE INVENTION

1. Field of the Invention

This invention relates generally to solid state lasers, and particularly to frequency mixing in small continuous wave (cw) microlasers.

2. Description of the Related Art

A laser is a device that has an ability to produce monochromatic, coherent light through the stimulated emission of photons from atoms, molecules, or ions of an active gain material which have been excited from a ground state to a higher energy level by an energy input from a pump source. A laser includes an optically resonant cavity defined by highly reflective surfaces, such as mirrors, that form a closed, round trip path for light energy. A gain material having suitable pump absorption characteristics and a suitable lasing transition is situated within the optical cavity so that, by a process of stimulated emission, the light energy circulating within the optical cavity can be amplified during its passage through the gain material.

One type of laser is a diode-pumped solid-state laser. In a diode-pumped solid-state laser, a laser diode supplies a pump beam into an optically resonant cavity in which solid-state gain material is disposed. Solid state lasant materials include crystalline or glassy host materials into which an active material, such as trivalent neodymium ions, is incorporated. The pump beam is at least partially absorbed by the gain material, causing lasant ions to make a transition to a higher energy level, which supplies the energy to support lasing operation. For small to moderate levels of optical power, microlasers have proven to be a very useful type of diode-pumped solid-state laser. A microlaser comprises a short element of solid-state gain material positioned in a resonant cavity. Typically, the two opposing reflective surfaces of the microlaser's resonant cavity are formed directly on opposing ends of the solid-state gain material to form a compact, reliable structure.

Monolithic diode-pumped solid-state microlasers can output laser radiation in a wavelength range between 900 and 1400 nm, dependent upon the composition of the gain material and other factors. Although this wavelength range is suitable for some uses, for many other important uses, a shorter wavelength is desirable. To provide these shorter wavelengths, diode-pumped solid-state lasers have been used in conjunction with a nonlinear optical material that performs second harmonic generation (SHG) that effectively doubles a fundamental frequency (i.e., halves its wavelength). For example, a green laser output results from frequency doubling the laser output of common solid-state laser materials. Since the efficiency of the nonlinear process is a function of the intensities of the fundamental beams, (i.e. a higher intensity causes greater efficiency), the nonlinear crystal is often placed inside the cavity of a low power continuous wave laser to benefit from the high intracavity intensity. A variety of applications, such as optical data storage, medical instrumentation, and communications have fueled the development of short wavelength diode-pumped solid state lasers, and microlasers in particular.

Frequency doubling with nonlinear crystals, which is useful to provide laser radiation at frequencies that cannot be obtained directly by laser diodes or solid state devices, is a well-known and established technique. Byer et al., in U.S. Pat. Nos. 4,739,507 and 4,731,787 disclose a diode-pumped laser having a harmonic generator. MacKinnon, *A Laser Diode Array Pumped, NY:YVO/KTP, Composite Material Microchip Laser*, Optics Comm. 105, 183 (1994) discloses a composite resonator microlaser which is intracavity doubled using potassium titanyl phosphate (KTP) as the harmonic generator. Often, for a composite resonant cavity, one reflective surface is formed on the solid-state gain material, and the second, opposing reflective surface is formed on the optical material forming part of the resonant cavity. Also, the nonlinear optical material can be bonded directly to the solid-state gain material. Thus, a composite resonant cavity is formed, extending between the distal ends of the composite structure.

One alternative technology is frequency mixing in which laser radiation at a first frequency is combined with laser radiation at a second, differing frequency to provide a third frequency. Depending upon the orientation of the nonlinear crystal, either the sum or the difference of the two input frequencies can be supplied. A straightforward frequency mixing system includes two separate lasers that supply the two laser beams which are then optically combined in the frequency mixing crystal. However, such two-cavity systems are expensive and difficult to align and to keep aligned. Dixon (U.S. Pat. No. 4,879,723 and U.S. Pat. 5,142,542) demonstrate systems in which the two laser wavelengths are separately generated, and then coupled to the same cavity where the sum-frequency is generated. These systems require that at least one source be a single longitudinal mode source for proper operation.

Akhavan-Leilabady (U.S. Pat. No. 4,956,843) discloses a laser system including two separate laser etalons, each defining separate cavities, that are pumped in series with a single pump source to generate two cw wavelengths in a single beam. One disadvantage of Akhavan-Leilabady's system is that a portion of the pump beam is absorbed in the first laser etalon before being supplied to the second laser etalon. If the gain material is highly absorbing, the second laser etalon would receive only minimal pump radiation.

A publication by de Barros, *Two-color Synchronously Mode-locked Femtosecond Ti:Sapphire Laser*, Opt. Lett. 18, 631 (1993)) discloses dual wavelength operation in the context of a mode-locked Ti:Sapphire laser pumped by a continuous laser source.

Shen, *Comparison of Simultaneous Multiple Wavelength Lasing in Various Neodymium Host Crystals at Transitions from $^4F_{3/2}$-$^4I_{11/2}$ and $^4F_{3/2}$-$^4I_{13/2}$*, Appl.Phys. Lett. 56 (20), p. 1937 (1990) and Shen, *Oscillation Condition of Simultaneous Multiple Wavelength Lasing*, Chinese Phys. Lett., Vol. 7, No. 4 (1990), pp. 174–176 discloses two-wavelength cw operation in a single Nd:YAP rod that was side-pumped by a lamp source. Particularly, Shen reports obtaining continuous-wave (cw) multiple wavelength operation using a Nd:YAP rod having a 5 mm diameter and a 104 mm length, in the α axis doped with 1% $Nd^{3+}$ ions, using a shared cavity defined by two external mirrors. The Nd:YAP rod was coated with a broadband antireflective film on both surfaces. Partially reflecting mirrors were utilized. The cavity mirrors included a back mirror with reflectivities of 98% and 100%, and an output mirror with the reflectivities of 89% and 98.5% for 1.0759 and 1.3414 μm, respectively. Shen recognizes that dual wavelength operation of Nd host crystals is easier to accomplish with pulsed operation. Furthermore, Shen states that, of the crystals studied, cw operation is only possible with YAP, and is not possible with the other crystals studied.

Shen, *Twice Sum-mixing of a Dual-wavelength ND:YALO₃ Laser to get 413.7-nm Violet Coherent Radiation* in LiIO$_3$ Crystal, J. Appl. Phys. 70 (3) pp. 1880–1881 (1991), discloses second-order sum-frequency mixing of dual outputs of a double-wavelength Nd:YALO$_3$ (Nd:YAP) laser to get orange (598.1 nm) coherent radiation after the first mixing and blue (413.7 nm) radiation after the second mixing.

It would be an advantage to provide a practical microlaser that lases at two wavelengths and that share a common laser gain material and beam path throughout, and in which the two wavelengths are intracavity mixed to generate either sum-frequency or difference-frequency radiation. Such a system would be useful to generate wavelengths difficult to generate directly or by frequency doubling.

It would be an advantage to provide an intracavity-mixed solid state microlaser in which the two fundamental wavelengths have a single mode to increase conversion efficiency. Much effort has been addressed at providing single longitudinal mode operation of one lasing transition. Kintz et al., in U.S. Pat. No. 4,942,582, disclose a technique for generating a single longitudinal mode frequency output by using highly absorbent lasant material. The Kintz patent discloses that if the absorption depth of the pump radiation in the gain material is small in comparison to the length of the optical cavity, single longitudinal mode operation can be obtained and thus, it has been shown that a highly absorbing gain material promotes single mode operation. It would be an advantage to provide an intracavity-mixed solid-state laser that uses a highly absorbing gain material to promote single mode operation at both of the fundamental frequencies.

SUMMARY OF THE INVENTION

A composite cavity microlaser is disclosed that lases at two fundamental wavelengths, denoted by $\lambda_1$ and $\lambda_2$, with the useful output being a third wavelength. The two fundamental wavelengths are frequency-mixed in a suitable nonlinear crystal that forms part of the composite cavity. The nonlinear crystal is oriented for phase-matched sum-frequency mixing of the two-wavelength beam to generate radiation at wavelength $\lambda_{sfm}$. In an alternate embodiment, the non-linear crystal is oriented so that the two wavelengths can be combined via a phase-matched difference frequency mixing process to generate radiation at $\lambda_{dfm}$.

The intracavity-mixed continuous wave (cw) solid-state laser device includes an optically resonant cavity defined by a first reflective surface and a second reflective surface, both of which are substantially reflective at a first and a second wavelength. A highly absorbing solid-state gain material, preferably neodymium-doped yttrium orthovanadate (Nd:YVO$_4$), is disposed within the optically resonant cavity. The gain material has a first gain transition at the first wavelength and a second gain transition at the second wavelength different from the first wavelength. Furthermore, the solid-state gain material defines a first lasing polarization for the first gain transition and a second lasing polarization for the second transition. The highly absorbing solid-state gain material is closely coupled to the first reflective surface to promote single mode operation of both fundamental lasing frequencies. A nonlinear crystal is disposed within the optically resonant cavity, and oriented with respect to the solid-state gain material to optically mix laser radiation at the first and second wavelengths to provide a third, frequency-mixed wavelength. An optical pump source is optically coupled through the first reflective face to end-pump the solid-state gain material with continuous pump radiation at a pump wavelength that is highly absorptive by the gain material.

In some embodiments, the solid-state gain material has an input face that includes the first reflective surface and the nonlinear crystal has an output face that includes the second reflective surface. In these embodiments, special dielectric coatings may be utilized to provide high reflectivity for the two desired fundamental wavelengths on both external crystal faces.

BRIEF DESCRIPTION OF THE DRAWINGS

The objects, advantages and features of this invention will be more readily perceived from the following detailed description, when read in conjunction with the accompanying drawing, in which.

DETAILED DESCRIPTION OF THE PREFERRED EMBODIMENTS

Laser radiation produced by a lasant material in an optical cavity can be single longitudinal mode in character or it can have two or more longitudinal modes. Except where specific reference is made to the longitudinal mode structure, reference herein to laser radiation as having a specific frequency or specific wavelength will be understood to include one or more of the longitudinal modes of substantially the same frequency which are generated by the lasant material and are supported within the optical cavity. While this invention is susceptible of having many different forms, described herein are specific exemplary embodiments of the invention.

Figure 1:
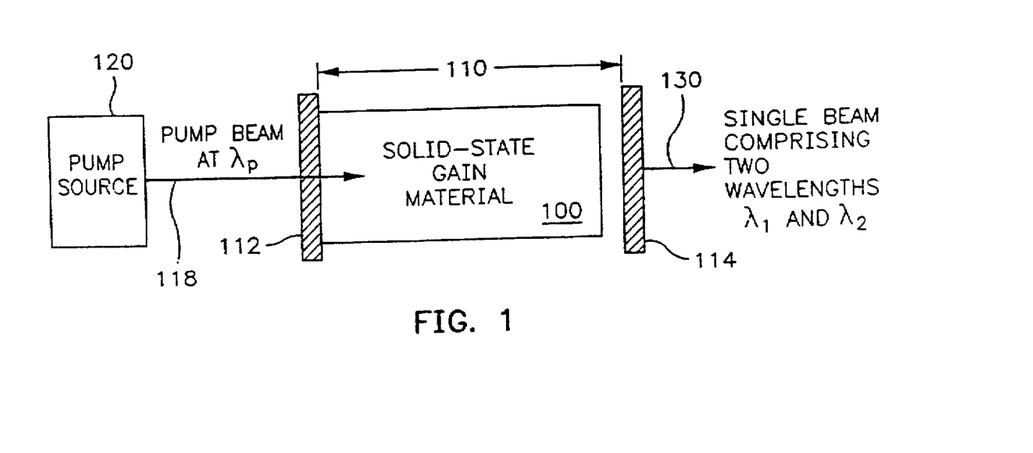
FIG. 1 is a schematic diagram of a dual frequency microlaser in accordance with the invention.

Referring now to the drawings, and more particularly to FIG. 1 thereof, the dual wavelength laser of the invention includes a solid-state gain (or "lasant") material 100 disposed within an optical cavity 110 defined by two dual wavelength reflectors 112 and 114. A pump beam 118 is generated by a suitable pump source 120, and applied to end pump the solid state gain material 100 through the input reflector 112. A beam of laser radiation comprising two wavelengths is generated in the optical cavity 110, and a dual wavelength output 130 is supplied through the output reflector 114.

The solid-state gain material 100 is selected to be a type that has at least two separate lasing transitions, and therefore, can lase at two separate, distinct wavelengths. The dual wavelength reflectors 112 and 114 have reflectivities designed to reflect both of those wavelengths. A preferred solid-state gain material includes a rare-earth ion, such as trivalent neodymium ($Nd^{3+}$), doped into a suitable host material such as $YVO_4$ and yttrium lithium fluoride whose formula is $YLiF_4$ ("YLF"). In such materials, the $Nd^{3+}$ ion has at least two possible lasing transitions: for example, in $YVO_4$, neodymium has a first lasing transition at around 1064 nm (the $^4F_{3/2}$ to $^4I_{11/2}$ transition) and a second lasing transition at around 1342 nm (the $^4F_{3/2}$ to $^4I_{13/2}$ transition).

Other suitable solid lasant materials include substances wherein the active material is a stoichiometric component of the lasant material such as, neodymium pentaphosphate, and lithium neodymium tetraphosphate ("LNP"). Detailed summaries of conventional solid lasant materials are set forth in the *CRC Handbook of Laser Science and Technology*, Vol. I, M. J. Weber, Ed., CRC Press, Inc., Boca Raton, Fla., 1982 pp. 72–135 and in Kaminskii, *Laser Crystals*, Springer Series in Optical Sciences, Vol. 14, D. L. Mac-Adam, Ed., Springer-Verlag, 1981.

Referring still to FIG. 1, the resonant optical cavity 110 of the laser is defined by the input reflector 112, closest to the pump beam, and by the output reflector 114, distal thereto, through which the dual wavelength output beam 130 is supplied. The input reflector 112 has a high reflectivity at the two fundamental wavelengths produced by lasing the gain material (e.g., 1064 nm and 1342 nm where a gain material of $Nd:YVO_4$ is used) to support lasing action within the optical cavity 110. Also, the input reflector 112 has a high transmission at the pumping wavelength (e.g., 809 nm for a conventional laser diode used as a pumping source) to allow the pumping radiation 118 to reach the solid state lasant material 100. The output reflector 114 is partially reflective at both fundamental wavelengths in order to provide high intensity intracavity radiation that supports lasing action, while allowing sufficient radiation to leak through to provide an output. In order to approximately balance the gain curves for each of the two output wavelengths (which define the net gain within the cavity, taking into account intracavity losses and gain from the lasant material for each wavelength) the reflectivities of each respective wavelength at the output coupler can be varied. For example, the output coupler's reflectivity at 1064 can be made less than that at 1342 nm to introduce higher losses at 1064 to compensate for the stronger transition at 1064. As a result, the gain curves respectively corresponding to the first lasing transition and the second lasing transitions can be approximately made equal. However, it is not necessary that the gain curves be exactly equal. The following discussion demonstrates how the reflectivities should be set to optimize dual-wavelength lasing operation.

Let $\sigma$ and $r$ be, respectively, the stimulated emission cross-section and the mirror reflectivity, with the subscripts 1 and 2 used to denote these qualities at the two different laser frequencies of interest. For a given mirror reflectivity $r_1$ at a first frequency $v_1$, for dual wavelength operation the mirror reflectivity $r_2$ at a second frequency $v_2$ is approximately:

$$\ln\left(\frac{1}{r_2}\right) = 2\alpha L \left(\frac{\sigma_2}{\sigma_1} - 1\right) + \frac{\sigma_2}{\sigma_1} \ln\left(\frac{1}{r_1}\right) \qquad \text{(Eqn. 1)}$$

where $\alpha$ is the loss coefficient of the gain medium at length L. The above equation assumes $\sigma_2$ is the stronger emission cross-section. The essence of the above equation is that a functional relationship exists between the desired reflectivities. In practice one would maximize the reflectivity for the weaker line ($r_1$) and then design $r_2$ to satisfy the above relationship.

In one embodiment, the solid-state gain material 100 defines a block having two opposing faces. Preferably, the block has the form of a thin etalon. The term "etalon" generally refers to a block with parallel faces and the term "thin" as used herein means an etalon preferably less than about 2.0 mm thick. Since it is not necessary that the crystal faces of the gain material be parallel in every embodiment, the term "block" will be used in some instances to refer to the element more broadly. In the preferred embodiment, the block of gain material comprises a rare-earth-doped crystal etalon with two opposite, flat, parallel, polished faces. Due to material limitations at the present time, the gain material would not be likely to function as desired if it were thinner than 0.1 millimeters.

The input reflector 112 is coupled closely to the solid state gain material 100 in order to "pin" (or locate) the gain as closely as possible to the input reflector, which defines one end of the optical cavity 110. Advantageously, pinning the gain close to the input reflector 112 promotes single longitudinal mode operation of both the first and the second wavelengths. In a preferred embodiment, the input reflector 112 is formed directly on a first face of the block of gain material. Furthermore, in some embodiments, the output reflector 114 is formed directly on the opposing face. In other embodiments, one or both of the reflectors may comprise a separate substrate of, for example, a high quality optical glass, and a reflective surface formed thereon. Different reflector configurations are illustrated and discussed more fully with reference to the embodiments of FIGS. 3, 4, and 5.

As discussed briefly above, the pump source 120 supplies the pump beam 118 to the solid-state gain material 100, thereby providing energy to raise the lasant mechanism (e.g., $Nd^{3+}$ ions within a crystal lattice) to a higher energy level. Preferably the pump beam 118 is supplied longitudinally, i.e., substantially parallel with the optical cavity 110. For most efficient operation, the pumping radiation emitted by the optical pump source should be matched with a suitable absorption band of the lasant material. However, any device producing optical pumping radiation having a wavelength effective to pump the lasant material can be used as the pump source in the practice of this invention. Preferably, as discussed in detail with reference to FIG. 6, the pumping radiation is strongly absorbed by the lasant material and therefore the pumping radiation is absorbed quickly in a short depth. For example, in $Nd:YVO_4$, a wavelength of 809 nm is strongly absorbed.

Suitable optical pumping sources include laser diodes, laser diode arrays, and light-emitting diodes (LEDs), including super-luminescent diodes and super-luminescent diode arrays and laser diode arrays. LEDs and laser diodes are available which, as a function of composition, produce output radiation having a wavelength within a range from about 630 nm to about 1600 nm. For the solid-state gain material Nd:YVO$_4$, for example, a suitable pump source is a laser diode that emits a near-infrared wavelength. For example, the wavelength of the output radiation from an aluminum gallium indium phosphide (AlGaInP) based device can be varied from about 630 nm to about 700 nm by variation of the device's composition. Similarly, the wavelength of the output radiation from a gallium aluminum arsenide (GaAlAs) based device can be varied from about 750 nm to about 900 nm by variation of the device's composition. Also, indium gallium arsenic phosphide (InGaAsP)-based devices can be used to provide radiation in the wavelength range from about 1000 nm to about 1600 nm.

Usually, a laser diode is attached to a heat sink which cools the laser diode during operation. Such cooling devices are commonly attached to a heat sink and packaged in a metal housing together with the laser diode. In some embodiments the heat sink can be passive in character, and in other embodiments the heat sink can comprise a thermoelectric cooler or other active temperature regulation system to help maintain the laser diode pumping source at a constant temperature and thereby ensure optimal operation of the laser diode at a constant wavelength. Any heat sink, thermoelectric cooler (TEC) or packaging that may be associated with a laser diode, a light-emitting diode, or an array of laser diodes or light-emitting diodes, is also included, all being conventional and readily understood by a person of ordinary skill in the art.

Figure 2:
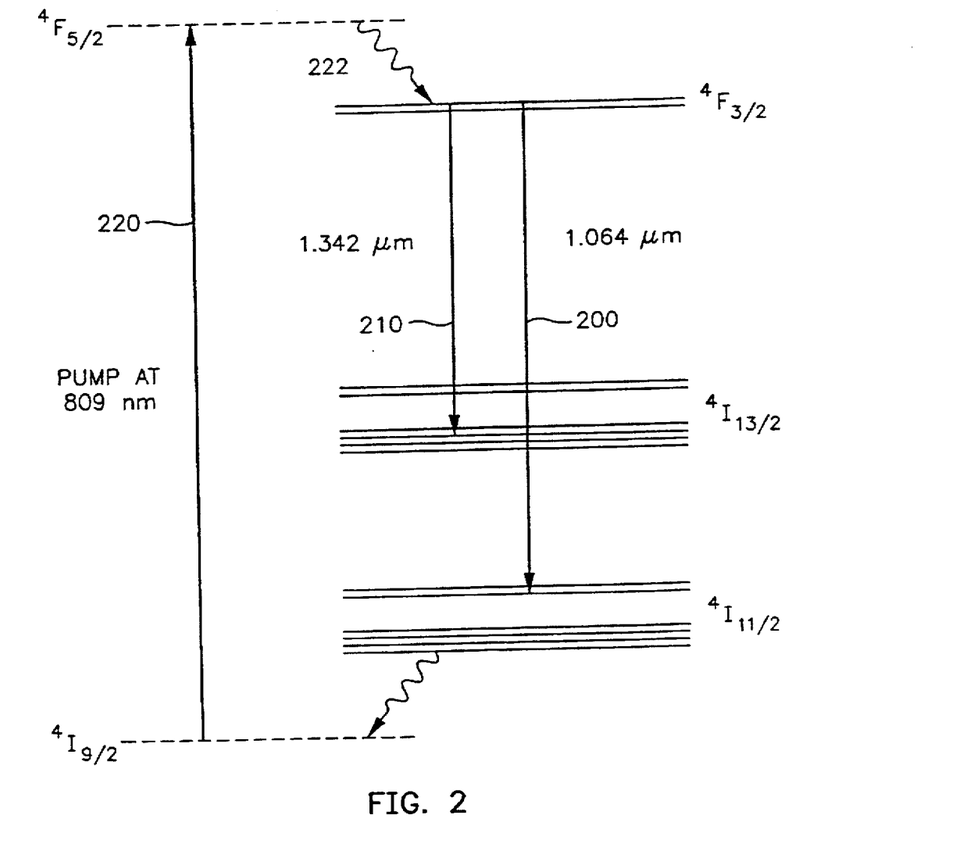
FIG. 2 is an energy level diagram of neodymium orthovanadate (Nd:YVO$_4$)

Reference is now made to FIG. 2, which is an energy level diagram of the solid state gain material Nd:YVO$_4$. The energy level diagram shows that at least two substantial lasing transitions are possible: the $^4F_{3/2}$ to $^4I_{11/2}$ transition (1064 nm) shown at 200 and the $^4F_{3/2}$ to $^4I_{13/2}$ transition (1342 nm) shown at 210. In operation, as shown at 220, the pump radiation at 809 nm raises the energy level of the lasant ions to a high level, and then by a process of phonon decay 222, their energy level drops to the $^4F_{3/2}$ level. From this next level, the lasant ion can have at least two possible transitions: the first transition 200 at 1064 nm and the second transition 210 at 1342 nm. Thus, the first lasing transition provides the first wavelength and the second lasing transition provides the second wavelength. The first lasing transition at 1064 is stronger than the 1342 nm transition.

Figure 3:
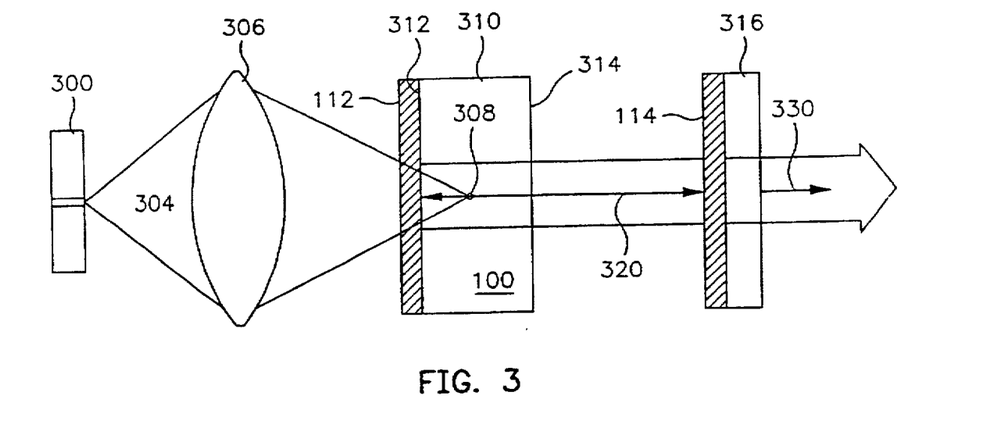
FIG. 3 is an embodiment of the dual wavelength microlaser of the invention in which the pump beam is lens coupled into the solid state gain medium.
Figure 4:
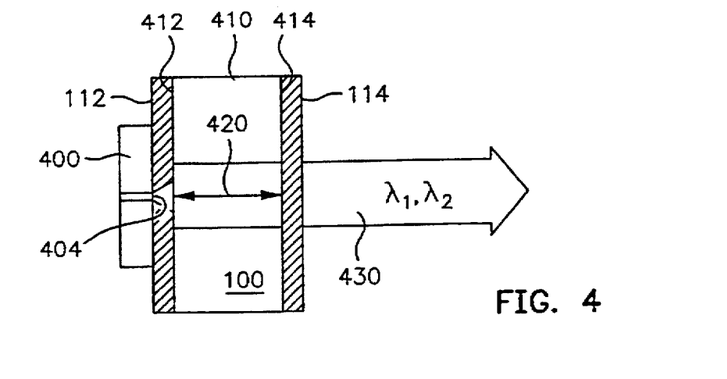
FIG. 4 is an alternative embodiment of the dual wavelength microlaser of the invention in which the pump beam is butt-coupled into the solid-state gain medium.
Figure 5:
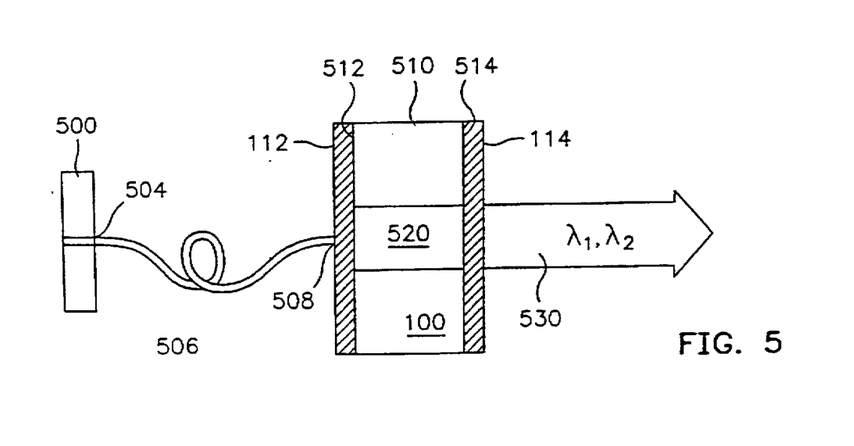
FIG. 5 is another alternative embodiment of the dual wavelength microlaser in which an optical fiber is utilized to transmit the pump beam from the pump source into the solid-state gain medium.

FIGS. 3, 4, and 5 show several different configurations of gain material, reflectors, and couplers for coupling the optical pumping radiation from the semiconductor light source into the gain material. Each provides high intensity pumping radiation where it interacts with the gain material, thereby providing a high photon-to-photon conversion efficiency in the lasant material.

Reference is now made to the embodiment of FIG. 3, which illustrates a "lens-coupled" configuration for coupling the output of a pump source comprising a semiconductor laser diode 300 into the gain material 100. The semiconductor laser diode 300, which has a narrow aperture, supplies a rapidly diverging beam 304 to a lens 306 that focuses the beam at a focal point 308 within the gain material 100. The term "lens" as used herein is defined to comprise any conventional focusing device such as a gradient index (i.e., GRIN) lens, a ball lens, an aspheric lens, an optical fiber positioned cross-wise, or a combination of lenses.

In the embodiment of FIG. 3, the gain material 100 is formed in a block 310 that includes a first face 312 and a second, opposing face 314. The input reflector 112 is coated directly on the first face 312. The second face 314 is anti-reflection coated for transmission at both fundamental wavelengths. The output reflector 114 is formed on a suitable optical substrate 316, such as BK-7 glass. Advantageously, in some circumstances it is easier to form a reflective coating on an optical surface such as glass rather than on a typical solid state crystal. Thus, an optical cavity 320 is defined between the input reflector 112 and the output reflector 114. Preferably, the laser diode 300, the lens 306, and the gain material 310 are all positioned so that the focal point of the lens 306 is situated within the gain material 100 but still close to the face 312.

In operation, the lens 306 focuses the pump beam 304 through the input reflector 112 and into the block 310, where it pumps the lasant ions to a high energy level. Focusing the output radiation advantageously provides high pumping intensity within the gain material 100, which results in a very high photon-to-photon conversion efficiency. Furthermore, in some embodiments, the focal point is positioned to provide a very small cross-sectional area so that approximately only one single transverse mode of laser operation (i.e. TEM$_{00}$ mode) is supported. To most efficiently accomplish such single transverse mode operation, optical pumping radiation is delivered directly along a longitudinal optical path in the lasant material.

In response to sufficient pumping, laser operation ensues within the optical cavity 320, generating a single beam 330 of laser radiation having components that include both the first and the second wavelengths.

FIG. 4 illustrates a preferred embodiment in which the pump source includes a semiconductor light source 400, preferably a laser diode, that has an output facet 404 situated in a "butt-coupled" configuration with respect to the gain material 100, which obviates the need for a lens. In the preferred embodiment of FIG. 4, the gain material 100 is formed in a block 410 that includes a first face 412 and a second, opposing face 414. The input reflector 112 is coated directly on the first face 412, and the output reflector 114 is coated directly on the second face 414, defining an optical cavity 420 between the input reflectors.

In this butt-coupled configuration, the output facet of the laser diode 400 is closely coupled to the input reflector 112 and the first face 412 of the block 410. Specifically, the output facet 404 is sufficiently close that the rapidly diverging beam of optical pumping radiation emanating therefrom optically end-pumps only a small transverse cross-sectional area within the block 410 of lasant material and supplies sufficient intensity within the gain material 100 to provide a high photon-to-photon conversion efficiency. Preferably, the output facet 404 is close enough to support essentially only one single transverse mode of laser operation (i.e., TEM$_{00}$ mode operation). In response to sufficient pumping, laser operation ensues within the optical cavity 420, generating a single beam 430 of laser radiation having components that include both the first and the second wavelengths. Advantageously, the embodiment of FIG. 4 provides a compact package that is efficient, cost-effective, and reliable in operation. Furthermore, because both reflectors 112 and 114 are bonded to the block 410 of gain material, and also because the laser diode 400 is coupled directly to the reflector 112 on the block 410, the laser is not subject to misalignment problems that can occur in other embodiments when one or both reflectors are separated from the gain material or when the pump source is not structurally coupled to the block.

Reference is made to FIG. 5 in which the pump source includes a semiconductor light source 500, preferably a laser diode, that has an output facet 504 optically coupled to an optical fiber 506 that, on an output end 508, is coupled into the gain material 100. In this embodiment, the gain material 100 is formed in a block 510 that includes a first face 512 and a second, opposing face 514. The input reflector 112 is coated directly on the first face 512, and the output reflector 114 is coated directly on the second face 514, defining an optical cavity 520 between the reflectors.

In the fiber-coupled configuration of FIG. 5, the output end of the fiber 506 is closely coupled to the input reflector 112 and the first face 512 of the block 510 so that the diverging beam of optical pumping radiation emanating therefrom optically end-pumps only a small transverse cross-sectional area within the block 510 of lasant material and thereby provides a high photon-to-photon conversion efficiency. When properly coupled, a fiber-coupled configuration can provide a pumping spot small enough to efficiently accomplish single transverse mode laser operation (i.e., TEM$_{00}$ mode operation).

After the gain medium has been sufficiently pumped through the fiber 506, laser operation ensues within the optical cavity 520, generating a single beam 530 of laser radiation having components that include both the first and the second wavelengths. Advantageously, the embodiment of FIG. 5 provides a system that is efficient, cost-effective, and reliable in operation for some uses. The fiber optic link allows the laser diode to be physically separated from the gain material block 510, which can be advantageous for some applications. Because both reflectors 112 and 114 are bonded to the block 510 of gain material, the laser is not subject to misalignment problems that can occur in other embodiments when one or both reflectors are separated from the gain material.

Figures 6, 7:
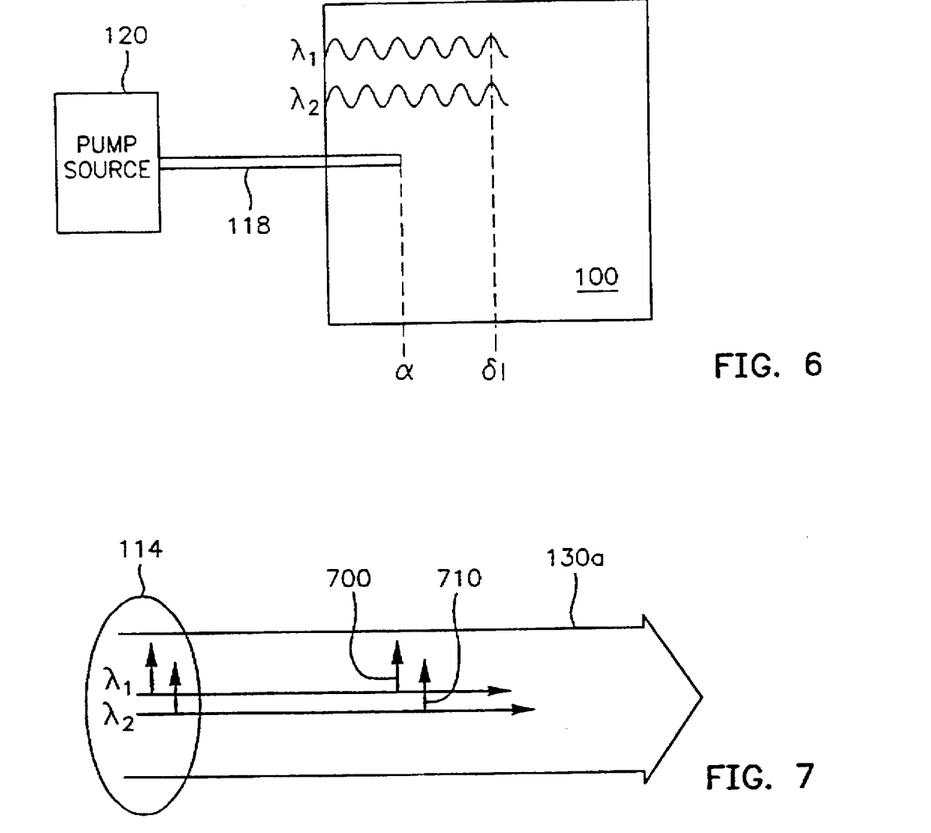
FIG. 6 is a diagram illustrating absorption of a highly absorptive pump wavelength in gain material.
FIG. 7 is a diagram illustrating a parallel polarization of dual wavelengths in the optical cavity of the invention.

Reference is now made to FIG. 6 which shows the high absorption of the pump wavelength in the solid state-gain material. Two characteristics of the device act in concert to enable dual wavelength operation: the reflectivities of the crystals are optimized for two wavelength operation, as discussed with reference to FIG. 1, and the oscillating wavelengths are sufficiently different that they fall out of phase in a distance small compared to the absorption depth of the gain material as will now be discussed. The gain material 100 is optically pumped by the pumping source 120 at a wavelength $\lambda_{pump}$ that matches a suitable absorption band of the gain material. Preferably, the pumping radiation is strongly absorbed by the lasant material and as a result, its absorption depth is small.

The wavelength separation of the two oscillating modes and their relationship to the absorption depth of the pump radiation facilitates efficient dual wavelength operation. When the wavelength $\lambda_1$ begins to oscillate in the laser, a spatially dependent distribution of the gain results, in conformance with the standing wave pattern of the oscillating wavelength $\lambda_1$. This spatial distribution is further modified by the exponential absorption of the pump radiation so that only one longitudinal mode at $\lambda_1$ oscillates (that at the longitudinal mode closest to the highest point under the gain curve of the material centered at $\lambda_1$). For wavelength $\lambda_2$ to oscillate, it must be able to effectively access the gain in those regions where the oscillating intensity of $\lambda_1$ is low. For this to occur the two wavelengths $\lambda_1$ and $\lambda_2$ must accumulate a sufficient phase differential ($\delta l$) in a distance small compared to the active length (i.e. the pumped length) of the gain material. This can be stated mathematically:

$$\delta l \equiv \frac{\lambda_1 \lambda_2}{2n(\lambda_2 - \lambda_1)} \ll \frac{1}{\alpha} \quad \text{(Eqn. 2)}$$

where $\delta l$ is the phase differential and is approximately equal to the distance which $\lambda_1$ and $\lambda_2$ are 180° out of phase, n≈2 is the index of refraction of the gain material and $\alpha$ is its absorption coefficient for the pump radiation. Thus, if the wavelength separation of the two oscillating modes is sufficiently large, then this condition can be satisfied in a gain material that is highly absorbing to the pump radiation for example, if $\lambda_1$=1064 nm and $\lambda_2$=1342 nm, then $\delta l$ =1284 nm and $\alpha$ must be much less than 7788 cm$^{-1}$.

Figure 8:
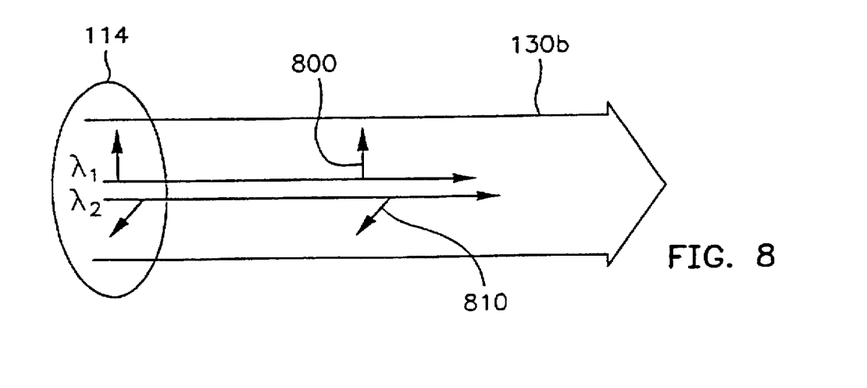
FIG. 8 is a diagram of perpendicularly polarized dual wavelengths in the optical cavity of the invention.

FIG. 7 and FIG. 8 represent the different polarizations that can be obtained using gain crystals that have preferred lasing orientations.

FIG. 7 illustrates a dual output beam 130 emanating from the output coupler 114. Within a beam 130a, the first wavelength $\lambda_1$ is illustrated as having a polarization illustrated by an arrow 700 that is parallel to the polarization illustrated by the arrow 710 for $\lambda_2$. Thus, the first wavelength has a polarization that is parallel to that of the second wavelength. It will be recognized by one skilled in the art that the polarizations may not be exactly parallel. For example, in one embodiment a gain material of Nd:YVO$_4$ is oriented within the cavity so that the c-axis is perpendicular to the propagation axis of the beam within the laser cavity. The pump beam is applied to the gain material so that its polarization is parallel with the c-axis. The preferred polarization for both emissions (at 1064 nm and 1342 nm) is parallel to the c-axis, and therefore the output beam 130 has the parallel polarizations illustrated in FIG. 7.

FIG. 8 represents a configuration in which the first wavelength $\lambda_1$ has a polarization illustrated by the arrow 800 while the second wavelength $\lambda_2$ has a polarization 810 perpendicular to polarization 800. This polarization is achieved by selecting a particular crystal orientation for the gain material within the optical cavity to provide the preferred polarizations. For example, in ND:YLF the strongest transition from the $^4F_{3/2}$ to the $^4I_{13/2}$ level at 1314 nm is found to be polarized perpendicular to the crystal c-axis, while the strongest transition from the $^4F_{3/2}$ to the $^4I_{11/2}$ level at 1047 nm is found to be parallel to the crystal c-axis. Thus, the two possible lasing wavelengths are perpendicular to one another. In an alternative embodiment using Nd:YLF, if the crystal is oriented within the cavity so that the a-axis of the crystal is aligned with the intra-cavity beam, then the output polarizations of the two wavelengths will be perpendicular as shown in FIG. 8.

By way of further example, certain specifications and characteristics are set forth for enhanced understanding of the invention. However, description of the device utilizing these materials is meant to illuminate, and not to limit, the invention.

Figure 9:
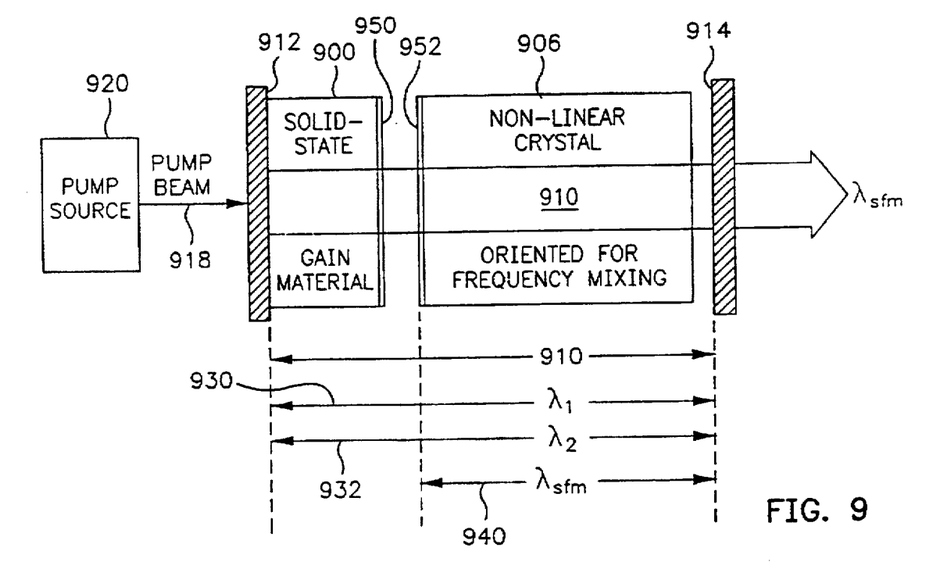
FIG. 9 is a schematic diagram of an intracavity mixed microlaser in accordance with the invention.

Referring now to FIG. 9, a solid state, intracavity-mixed laser is shown. The intracavity-mixed laser includes a solid-state gain material 900 and a nonlinear crystal 906 disposed within an optical cavity 910 defined by an input reflector 912 and an output reflector 914. The solid-state gain material 900 is selected to be a type that has at least two lasing transitions and therefore, can lase at two separate, distinct wavelengths, denoted by $\lambda_1$ and $\lambda_2$. Each wavelength has a preferred lasing orientation. The gain material 900 is oriented with respect to the nonlinear crystal 906 so that the output propagation axis of the two wavelengths are collinear and phase-matched for optical frequency mixing. A pump beam 918 is generated by a suitable pump source 920, and applied to end pump the solid state gain material 900 through the input reflector 912. Within the optical cavity 910, a high intensity beam of dual wavelength laser radiation at $\lambda_1$ and $\lambda_2$ is generated, and remains contained within the cavity 910 by the reflectors 912 and 914. This dual wavelength, high intensity intra-cavity beam is frequency mixed within the nonlinear crystal 906, and the resultant frequency-mixed output at $\lambda_{fm}$ is supplied through the output reflector 914.

The pumping diode energy at 809 nm enters at the input face, and as illustrated at 930 and 932, causes lasing at the first wavelength $\lambda_1$ and the second wavelength $\lambda_2$ respectively within the composite cavity 910. The round trip results in a sum-frequency mixing to $\lambda_{sfm}$ as illustrated at 940. Because of the output face's high transmissivity for light energy at that frequency (as low as 50% to as high as 99%), laser radiation at $\lambda_{sfm}$ is transmitted from the composite cavity as useful visible laser energy.

In one embodiment, the two wavelengths are combined in a suitable nonlinear crystal that forms part of the composite cavity to generate radiation at wavelength $\lambda_{sfm}$, via a phase-matched sum-frequency mixing process. In an alternate embodiment, the two wavelengths can be combined via a phase-matched difference frequency mixing process to generate radiation at $\lambda_{dfm}$. Mathematically, the frequency mixing process satisfies the following two relations:

$$\text{sum frequency mixing: } \omega_1 + \omega_2 = \omega_{sfm};$$

$$\text{equivalently } \frac{1}{\lambda_1} + \frac{1}{\lambda_2} = \frac{1}{\lambda_{sfm}}$$

$$\text{difference frequency mixing: } |\omega_1 - \omega_2| = \omega_{dfm};$$

$$\text{equivalently } \left|\frac{1}{\lambda_1} - \frac{1}{\lambda_2}\right| = \frac{1}{\lambda_{dfm}}$$

In order to accomplish frequency mixing, the gain material 900 is oriented with respect to the nonlinear crystal 906 so that the output propagation axis of the two wavelengths $\lambda_1$ and $\lambda_2$ are collinear and are phase-matched for optical frequency mixing. When the two oscillating wavelengths $\lambda_1$ and $\lambda_2$ have polarizations which are parallel to one another as shown in FIG. 7, the nonlinear crystal must be suitable for Type I phase matching. Examples of Type I phase matching crystals include lithium borate (LBO) and lithium niobate (LiNBO). If the two oscillating wavelengths have polarizations which are perpendicular to one another as shown in FIG. 8, the nonlinear crystal must be suitable for Type II phase matching. An example of Type II phase matching crystals includes potassium titanyl phosphate KTP.

The resonant optical cavity 910 of the intracavity-mixed laser is defined by the input reflector 912 and the output reflector 914. The input reflector 912 is closest to the pump source 920. Both the input reflector 912 and the output reflector 914 have a high reflectivity at the two fundamental wavelengths ($\lambda_1$ and $\lambda_2$) produced by lasing the gain material (e.g., 1064 nm and 1342 nm where a gain material of Nd:YVO$_4$ is used) to support a high intensity beam within the optical cavity 910. Also, the input reflector 912 has a high transmissivity at the pumping wavelength (e.g., 809 nm for a conventional laser diode used as a pumping source) to allow the pumping radiation 918 to reach the solid state lasant material 900.

The interior faces include a first interior face 950 formed on the gain material 900 and a second interior face 952 formed on the opposite face of the non-linear crystal 906. These interior faces are both coated for high transmissivity at the fundamental wavelength $\lambda_1$ and $\lambda_2$. Either or both could be coated for high reflection at the frequency mixed wavelength $\lambda_{fm}$.

In the preferred embodiment, the reflectivities of each of the crystal faces are designed to maximize the circulating flux within the resonator. These reflectivities range between 99.5% and >99.9% for the wavelengths $\lambda_1$ and $\lambda_2$ for the input and output reflectors 912 and 914, and between 0% and 0.25% for the interior faces 950 and 952. The reflectivities for $\lambda_{sfm}$ (for sum-frequency mixing) and $\lambda_{dfm}$ (for difference-frequency mixing) range between 80% and 100% on the input reflector 912 and between 0% and 10% on the output reflector 914, the first interior face 950, and the second interim face 952. This reflectivity arrangement enables low threshold pumping to achieve lasing at both wavelengths $\lambda_1$ and $\lambda_2$.

More specifically, for the preferred dual wavelength laser comprising a Nd:YVO$_4$ gain material and an LBO crystal oriented for sum-frequency mixing, Table I below sets forth the reflectivities for each face at each wavelength:

TABLE I

REFLECTIVITIES

| Wavelength | Input Reflector 912 | Output Reflector 914 | First Interior Face 950 | Second Interior Face 952 |
|---|---|---|---|---|
| 809 nm (pump) | <5% | — | — | — |
| 1064 nm | ≥99.9% | ≥99.9% | <0.25% | <0.25% |
| 1342 nm | ≥99.9% | ≥99.9% | <0.25% | <0.25% |
| 594 nm (output) | ≥90% | ≤50% | <1 | <1% |

A preferred solid-state gain material 900 includes a rare-earth ion, such as trivalent neodymium (Nd$^{3+}$), doped into a suitable host material such as YVO$_4$, and YLF. In such materials, the Nd$^{3+}$ ion has at least two possible lasing transitions: a first lasing transition around 1064 nm (the $^4F_{3/2}$ to $^4I_{11/2}$ transition) and a second lasing transition (the $^4F_{3/2}$ to $^4I_{13/2}$ transition) around 1342 nm. In the preferred embodiment, a 594 nm output results from sum-frequency mixing the laser radiation generated from the $^4F_{3/2}$ to $^4I_{11/2}$ (1064 nm) and $^4F_{3/2}$ to $^4I_{13/2}$ (1342 μm) transitions.

Other suitable solid lasant materials include substances wherein the active material is a stoichiometric component of the lasant material (e.g., neodymium yttrium aluminum borate or NYAB). Such materials include, for example, neodymium pentaphosphate and lithium neodymium tetraphosphate ("LNP"). Detailed summaries of conventional solid lasant materials are set forth in the Weber, Ed., *CRC Handbook of Laser Science and Technology*, Vol. I, CRC Press, Inc., Boca Raton, Fla., 1982 pp. 72–135 and by Kaminskii, *Laser Crystals*, Vol. 14 of the Springer Series in Optical Sciences, D. L. Mac-Adam, Ed., Springer-Verlag, New York, N.Y., 1981.

In one embodiment, the solid-state gain material 900 defines a block having two opposing faces. Preferably, the block has the form of a thin etalon. The term "etalon" generally refers to a block with parallel faces and the term "thin" as used herein means an etalon preferably less than 2.0 mm thick. However, due to material limitations at the present time, the gain material would not be likely to function as desired if it were thinner than 0.1 mm. Since it is not necessary that the faces of the block of gain material be parallel in every embodiment, the term "block" will be used in some instances to refer to the element more broadly.

The input reflector 912 is coupled closely to the solid state gain material 900 in order to "pin" the gain as closely as possible to the input reflector, which defines one end of the optical cavity 910. Advantageously, pinning the gain close to the input reflector 912 promotes single longitudinal mode operation of both the first and the second wavelengths. In some embodiments, the input reflector 912 is formed directly on the input face of the block of solid state gain material 900 and the output reflector 914 is formed directly on the distal face of the nonlinear crystal 906. In other embodiments, one or both of the reflectors 912 and/or 914 may comprise a separate substrate of, for example, a high quality optical glass, and a reflective surface formed thereon.

Materials suitable for use as a nonlinear crystal 906 include those which have nonlinear optical properties. The most common nonlinear crystals comprise inorganic compounds. For example, non-linear optical properties are possessed by materials having the formula MTiO(XO$_4$) where "M" is at least one of the elements potassium (K) and rubidium (Rb), and "X" is at least one of the elements phosphorus (P) or arsenic (As). This generic formula includes potassium titanyl phosphate KTiOPO$_4$ (KTP), a particularly useful nonlinear material for second-harmonic generation. Other known nonlinear optical materials include, but are not limited to KH$_2$PO$_4$ or KDP, LiNbO$_3$, KNbO$_3$, β-BaB$_2$O$_4$ or BBO, Ba$_2$NaNb$_5$O$_{15}$, LiIO$_3$, KB$_5$O$_8$.4H$_2$O, potassium lithium niobate, urea and organic nonlinear materials. A review of nonlinear optical materials is provided in Dimitriev, *Handbook of Nonlinear Optical Crystals*, Vol. 64 of the Springer Series in Optical Sciences, Springerverlag 1991, V. G. Dimitriev, G. G. Guvzadyan, D. N. Nikogosyan.

The nonlinear crystal 906 may have the form of a cylinder with a diameter at least sufficient to contain the dual wavelength beam. Preferably this cylinder has a length between 0.1 to 12.0 mm and is polished to etalon tolerances. The face of the nonlinear crystal closest to the gain material is coated for high transmission (i.e., greater than 99.9%) at the fundamental wavelengths and at the output wavelength. The opposite face is coated for high reflection at the fundamental wavelengths and for high transmission (typically greater than 90%) at the harmonic output wavelength.

In a specific embodiment, the gain material 900 comprises neodymium yttrium orthovanadate (Nd:YVO$_4$) and the nonlinear crystal 906 comprises lithium borate (LBO), cut to provide phase matching for a sum frequency mixing process. A suitable pumping source 920 includes at least one gallium aluminum arsenide (GaAlAs) diode laser emitting at a wavelength of 809 nm.

Figure 10:
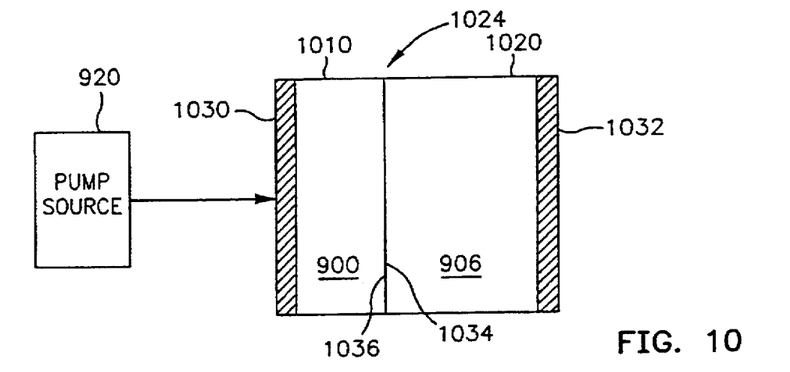
FIG. 10 is a diagram of an alternative embodiment of an intracavity mixed microlaser of the invention in which the solid-state gain material is bonded to the nonlinear crystal and the crystal faces are coated directly on opposing surfaces of the gain material and nonlinear crystal.

In the preferred embodiment of FIG. 10, the block 1010 of gain material 900 comprises a rare earth doped crystal and has the form of an etalon with two opposite, flat, parallel polished faces. A nonlinear crystal block 1020, which is bonded thereto as illustrated at 1024, has a cylindrical shape with two opposite flat, parallel polished faces. Bonding between the two blocks 1010 and 1020 can be accomplished by using an optical contact, diffusion bonding, optical cement, or an index matching fluid epoxy, among others. The nonlinear crystal block 1020 would normally be about 0.1 to 12.0 mm long with the gain crystal block 1010 being 0.1 to 2 mm between flat faces. The nonlinear optical frequency mixing crystal is preferably less than approximately 10 mm long. Thus, the distance between the exterior faces of the cavity ranges between about 0.2 and 14 mm. In the preferred embodiment, a 594 nm output results from sum-frequency mixing, the laser radiation generated from the $^4F_{3/2}$ to $^4I_{11/2}$ (1064 nm) and $^4F_{3/2}$ to $^4I_{13/2}$ (1342 nm) transitions.

In this embodiment, an outer (or pumping) face 1030 of the gain material block 1010 is coated for high reflectivity at the two fundamental wavelengths $\lambda_1$ and $\lambda_2$ produced by lasing the gain material (e.g., 1064 nm and 1342 nm where a gain material of Nd:YVO$_4$ is used) and high transmission at the pump wavelength (e.g., 809 nm). The pumping face 1030 may also be coated with a dielectric for high reflection (HR) at $\lambda_{sfm}$ (for sum-frequency mixing) or $\lambda_{dfm}$ (for difference-frequency mixing). In this embodiment, the resonant optical cavity is defined by an input reflective surface 1030 coated directly on the gain material block 1010 and an output reflective surface coated directly on the nonlinear crystal block. An inner surface 1034 of the gain material, and the inner surface 1036 of the nonlinear crystal are antireflection-coated for both fundamental wavelengths. Preferably, the two surfaces of the gain material and the two surfaces of the nonlinear crystal are polished flat and parallel to etalon tolerances (e.g., typical parallelism better than 2 arc-seconds). Those skilled in the art will appreciate that it is easier to evenly polish a flat surface than it is to polish a curved surface. One advantage of using sub-millimeter thickness platelets is the relative ease at which they can be made in quantity and assembled together, which advantageously provides a low cost of manufacture.

Figure 11:
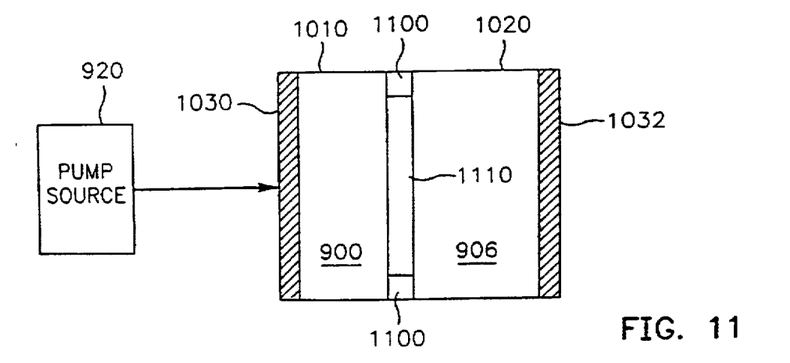
FIG. 11 is a diagram of an alternative embodiment as in the FIG. 10 except that a dielectric spacer is positioned between the gain material and the non-linear crystal.

FIG. 11 discloses an embodiment similar to FIG. 10, except that it includes a dielectric spacer 1100 is inserted between the lasing material crystal block 1010 and the optical frequency mixing crystal block 1020. The spacer 1100 is annular in shape and creates a small air gap 1110 between the crystals. The air gap 1110 could be between 25 and 500 µm, and preferably is between 50 and 100 µm. The pumping source 920 and exterior end faces 1030 and 1032 operate the same as described for the other embodiments. The interior faces 1034 and 1036 are anti-reflection coated and their functions are substantially the same as the interior faces described above with reference to FIG. 10. The air gap 1100 solves any difficulties in bonding the lasant material to the optical frequency mixing crystal that could otherwise compromise the integrity of the anti-reflection coatings for efficient operation of the laser. Advantageously, the spacer 1100 provides a cost efficient coupling between the lasant material and the optical frequency mixing crystal, while maintaining the integrity of the anti-reflection coatings on either side of the air gap.

While in the preferred embodiment both external end faces are flat and parallel, such a configuration is not necessary for functioning of the invention. For example, one or both of the faces could be concave, or one face could be concave and the other convex.

Figure 12:
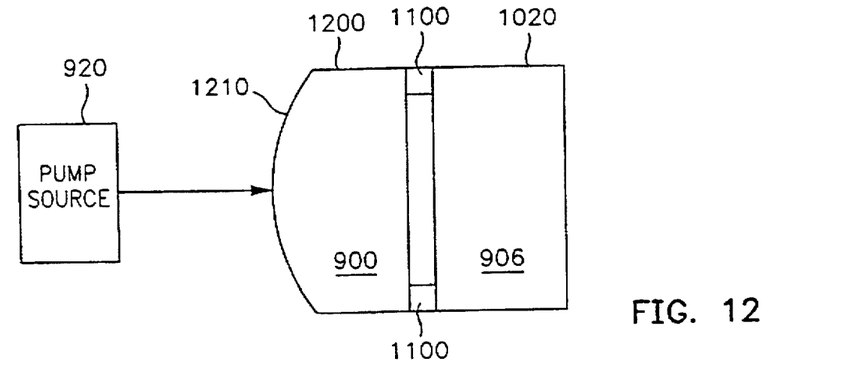
FIG. 12 is a diagram of an alternative embodiment of the invention in which the input face to the gain material is convex.
Figure 13:
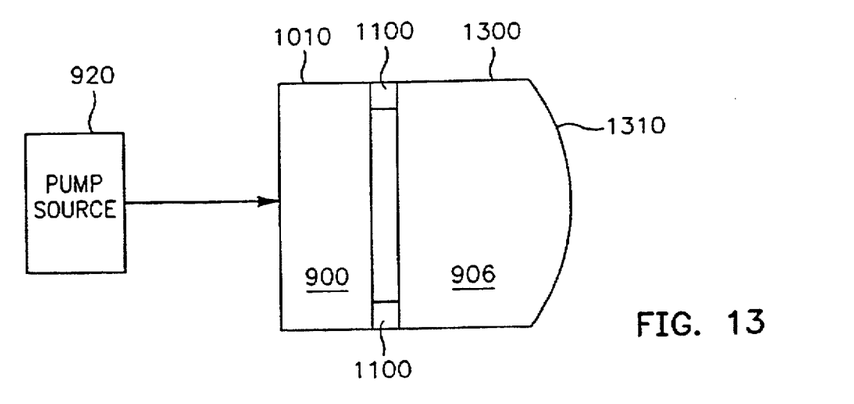
FIG. 13 is a diagram of a further alternative embodiment of the invention in which the output face of the non-linear crystal is convex.

FIG. 12 shows an embodiment similar to that of FIG. 11, except that a block 1200 of gain material 900 comprises a curved convex surface 1210 upon which the input reflector 912 may be formed. FIG. 13 also shows an embodiment in which one of the faces of the cavity is convex. A block 1300 of the non-linear crystal 906 comprises a convex surface 1310 upon which an output reflector may be formed. In either case the radius of curvature is greater than the distances between the faces of the etalon.

Figure 14:
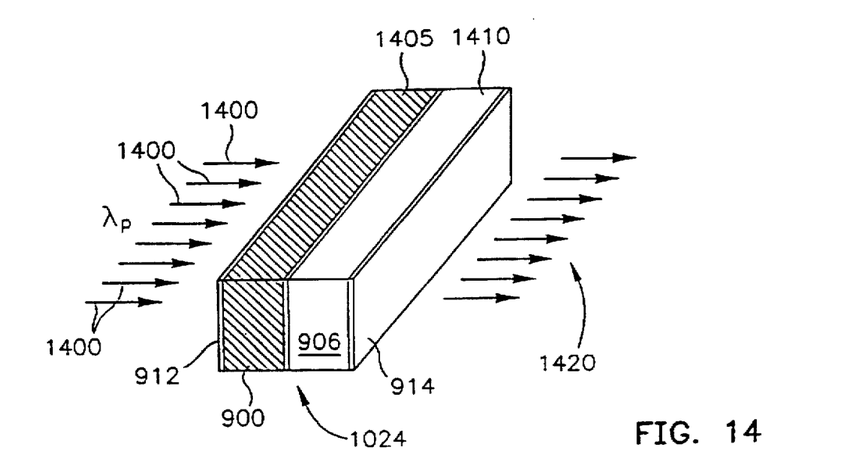
FIG. 14 shows a linear array of composite cavity microlasers as an alternative embodiment of the invention.

Reference is now made to FIG. 14, which illustrates a long block of solid state gain material 900 pumped by a linear array of pump spots 1400, such as could be generated by a stripe laser to create a linear array of sum or difference frequency microlasers. The array of pump spots can be provided by any conventional pump source and/or optical technique such as an array of diode emitters, an array of fibers used to couple radiation from a pump source, or a diffractive beamsplitter.

The pump spots are provided through the input reflector 912 to a long block 1405 of solid-state gain material 900. A block 1410 of non-linear crystal material 906 is bonded to the gain material as illustrated at 1024. The output reflector 914 is formed on the opposite side of the non-linear block 906. The operation of the array configuration of FIG. 14 advantageously provides a series of output beams 1420 at the frequency mixed wavelength $\lambda_{fm}$. It is advantageous that the laser of this invention employs separate crystals for lasing and for wavelength conversion, which permits use of readily available crystals that are more appropriate for their respective function. Particularly, using a separate gain material crystal allows selection of a gain material that is highly absorbing at the pump wavelength, which facilitates efficient operation of the laser at two distinct wavelengths.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and separate features of the invention may be utilized. For example, the precise geometric shape of the lasant material can be varied—the crystal can be circular or rectangular in shape. The drawing figures are schematic only, intended to show element relationships, but not to depict specific sizes and shapes. Thus, it will be appreciated that various modifications, alternatives, and variations, may be made without departing from the spirit and scope of the invention as defined in the appended claims. It is, of course, intended to cover by the appended claims all such modifications involved within the scope of the claims.

What is claimed is:

1. An intracavity-mixed continuous wave (cw) solid state laser device that is optically pumped by a pump beam, comprising:

an optically resonant cavity that defines a single beam path for a first and a second wavelength, including a first reflective surface and a second reflective surface that are substantially reflective at said second wavelengths said first reflective surface being substantially transmissive to said pump beam;

a solid state gain material disposed within said optically resonant cavity and within said single beam path, said gain material having a first gain transition at the first wavelength and a second gain transition at the second wavelength different from said first wavelength, said solid state gain material defining a first lasing polarization direction for said first gain transition and a second lasing polarization direction for said second transition, said solid state gain material being closely positioned to said first reflective surface; and a nonlinear crystal disposed within said optically resonant cavity and oriented with respect to said solid state gain material to optically mix laser radiation at said first and second wavelengths to provide a third, frequency-mixed wavelength.

2. The solid state laser device of claim 1, and further comprising an optical pump source optically coupled through said first reflective face to end-pump said solid state gain material with continuous pump radiation at a pump wavelength that is highly absorptive by said gain material.

3. The solid state laser device of claim 1, wherein said solid state gain material comprises an input face that is highly transmissive to said pump radiation and wherein said first reflective surface is formed on said input face.

4. The solid state laser device of claim 3, wherein said nonlinear optical material comprises a first face proximate to said gain material and a second, opposite face distal from said gain material, and wherein said second reflective surface is formed on said second face.

5. The solid state laser device of claim 1, wherein said solid state gain material comprises a first face and a second, opposite face proximate to said nonlinear optical material, and wherein said first reflective surface is formed on said first face.

6. The solid state laser device of claim 1, wherein said nonlinear optical material comprises a first face proximate to said gain material and a second, opposite face distal from said gain material, and wherein said second reflective surface is formed on said second face.

7. The solid state laser device of claim 1, wherein said solid state gain material comprises a rare earth element.

8. The solid state laser device of claim 7, wherein said rare earth element comprises neodymium.

9. The solid state laser device of claim 7, wherein said crystal comprises Nd:YVO$_4$.

10. The solid state laser device of claim 1, wherein said solid state gain material comprises a uniaxial crystal oriented within said optical cavity to provide said first and second lasing polarizations for said first and said second wavelengths.

11. An intracavity-mixed continuous wave (cw) solid state laser device comprising:

an optically resonant cavity including a first reflective surface and a second reflective surface that are substantially reflective at a first and a second wavelength;

a solid state gain material including a uniaxial crystal doped with a rare earth element, said gain material having a first gain transition at the first wavelength and a second gain transition at a second wavelength different from said first wavelength, said solid state gain material defining a first lasing polarization direction for said first gain transition and a second lasing polarization direction for said second transition, said solid state gain material being closely coupled to said first reflective surface and disposed within said optically resonant cavity; and a nonlinear crystal disposed within said optically resonant cavity and oriented with respect to said solid state gain material to optically mix laser radiation at said first and second wavelengths to provide a third, frequency-mixed wavelength.

12. The solid state laser device of claim 5, wherein said rare earth element comprises neodymium.

13. The solid state laser device of claim 5, wherein said uniaxial crystal comprises Nd:YVO$_4$.

14. The solid state laser device of claim 1, wherein said nonlinear crystal is oriented with respect to said solid state gain material for Type I phase matching.

15. The solid state laser device of claim 1, wherein said nonlinear crystal is oriented with respect to said solid state gain material for Type II phase matching.

16. The solid state laser device of claim 1, wherein said nonlinear crystal is oriented with respect to said solid state gain material to provide sum frequency mixing.

17. The solid state laser device of claim 1, wherein said nonlinear crystal is oriented with respect to said solid state gain material to provide difference frequency mixing.

18. An intracavity-mixed continuous wave (cw) solid state laser device that is optically pumped by a pump beam, comprising:

a solid state gain material defining a block having a first face and a second, opposite face, said gain material having a first gain transition at a first wavelength and a second gain transition at a second wavelength;

a first reflective surface closely coupled to said first face, said first reflective surface being substantially reflective at both said first and said second wavelengths, and substantially transmissive to said pump beam;

a nonlinear crystal coupled to said second face of said solid state gain material, said nonlinear crystal being oriented with respect to said gain material to convert said first and second wavelengths to a third wavelength; and an output coupler coupled to said nonlinear crystal, including a second reflective surface that is substantially reflective at both said first and said second wavelengths, said second reflective surface being oriented with respect to said first reflective surface to define an optical cavity through said solid state gain material and said nonlinear crystal so that both of said wavelengths share a common path through said gain material and said nonlinear crystal.

19. The solid state laser device of claim 18, and further comprising an optical pump source optically coupled through said first reflective face to end-pump said solid state gain material with continuous pump radiation at a pump wavelength, and wherein said gain material is highly absorptive of said pump wavelength.

20. The solid state laser device of claim 18, wherein said first reflective surface is formed on said first face of said gain material.

21. The solid state laser device of claim 18, wherein said second reflective surface is formed on said second face of said gain material.

22. The solid state laser device of claim 18, wherein said solid state gain material comprises a crystal doped with a rare earth element.

23. The solid state laser device of claim 22, wherein said rare earth element comprises neodymium.

24. The solid state laser device of claim 22, wherein said crystal comprises $Nd:YVO_4$.

25. The solid state laser device of claim 18, wherein said solid state gain material comprises a uniaxial crystal oriented within said optical cavity to provide a preferred polarization for said first and said second wavelengths.

26. The solid state laser device of claim 25, wherein said uniaxial crystal is doped with a rare earth element.

27. The solid state laser device of claim 26, wherein said rare earth element comprises neodymium.

28. The solid state laser device of claim 26, wherein said uniaxial crystal comprises $Nd:YVO_4$.

29. The solid state laser device of claim 18, wherein said nonlinear crystal is oriented with respect to said solid state gain material for Type I phase matching.

30. The solid state laser device of claim 18, wherein said nonlinear crystal is oriented with respect to said solid state gain material for Type II phase matching.

31. The solid state laser device of claim 18, wherein said nonlinear crystal is oriented with respect to said solid state gain material to provide sum frequency mixing.

32. The solid state laser device of claim 18, wherein said nonlinear crystal is oriented with respect to said solid state gain material to provide difference frequency mixing.

33. A method for generating continuous-wave laser radiation in an optically resonant cavity including a block of solid state laser material and an intracavity nonlinear material optical element, the method comprising the steps of:

a) continuously end-pumping the block of solid state laser material through an input reflector that is closely positioned to said laser material with pump radiation that is highly absorbed by said laser material;

b) generating a single laser beam within said optically resonant cavity, said single laser beam including substantial continuous first laser radiation at a first wavelength having a first polarization and substantial continuous second laser radiation at a second wavelength having a second polarization;

c) in said intracavity nonlinear optical crystal, frequency mixing said first laser radiation with said second laser radiation to generate continuous frequency-mixed laser radiation at a third wavelength; and d) outputting said continuous frequency-mixed laser radiation from said optically resonant cavity.

34. The method of claim 33, wherein in said step c, said first laser radiation and said second laser radiation are sum-frequency mixed to generate continuous sum-frequency laser radiation at a frequency that is approximately equal to the sum of the frequencies of the first laser radiation and the second laser radiation.

35. The method of claim 33, wherein in said step c, said first laser radiation and said second laser radiation are difference-frequency mixed to generate continuous difference-frequency laser radiation at a frequency that is approximately equal to the difference between the frequencies of the first laser radiation and the second laser radiation.

36. The method of claim 33, wherein in said step b, said first laser radiation oscillates at a first polarization and said second laser radiation oscillates at a second polarization approximately parallel with said first polarization, and in said step c, said frequency-mixing includes Type I phase matching.

37. The method of claim 33, wherein in said step b, said first laser radiation oscillates at a first polarization and said second laser radiation oscillates at a second polarization approximately perpendicular with said first polarization, and in said step c, said frequency-mixing includes Type II phase matching.

38. The method of claim 33, wherein said step b includes oscillating said first laser radiation and said second laser radiation within a composite cavity defined by a first reflective surface formed on said solid state gain material and a second reflective surface formed on said nonlinear optical material.

39. An intracavity-mixed continuous wave (cw) microlaser device comprising:

a solid state gain material comprising a microlaser crystal providing a first gain transition at a first wavelength and a second gain transition at a second wavelength, said solid state gain material defining a first lasing polarization for said first gain transition and a second lasing polarization for said second transition, said microlaser crystal having a first side that is substantially reflective at said first and said second wavelengths and a second, opposite side that is substantially transmissive at said first and said second wavelengths;

a nonlinear conversion crystal coupled to said second side of solid state gain material and oriented with respect thereto for optical sum-frequency mixing, said nonlinear conversion crystal having a first side coupled to said solid state gain material and a second opposite side that is substantially reflective at said first and said second wavelengths, so that said gain material and said conversion crystal together form a composite cavity and both of said wavelengths share a common path through said gain material and said nonlinear crystal; and an optical pump source in effective operative relationship with said composite cavity for end-pumping said gain material through said first side of said microlaser crystal with pump radiation at a wavelength that is highly absorptive by said gain material.

40. The solid state microlaser device of claim 39, wherein said solid state gain material comprises a crystal doped with a rare earth element.

41. The solid state microlaser device of claim 40, wherein said rare earth element comprises neodymium.

42. The solid state microlaser device of claim 40, wherein said crystal comprises $Nd:YVO_4$.

43. The solid state microlaser device of claim 39, wherein said solid state gain material comprises a uniaxial crystal oriented within said optical cavity to provide said first and second lasing polarizations for said first and said second wavelengths.

44. An intracavity-mixed continuous wave (cw) microlaser device comprising:

a solid state gain material comprising a uniaxial crystal doped with a rare earth element, said gain material providing a first gain transition at a first wavelength and a second gain transition at a second wavelength, said gain material defining a first lasing polarization for said first gain transition and a second lasing polarization for said second transition, said gain material having a first side that is substantially reflective at said first and said second wavelengths and a second, opposite side that is substantially transmissive at said first and said second wavelengths;

a nonlinear conversion crystal coupled to said second side of gain material and oriented with respect thereto for optical sum-frequency mixing, said nonlinear conversion crystal having a first side coupled to said gain material and a second opposite side that is substantially reflective at said first and said second wavelengths, so that said gain material and said conversion crystal together form a composite cavity and both of said wavelengths share a common path through said gain material and said nonlinear crystal; and an optical pump source in effective operative relationship with said composite cavity for pumping said gain material with pump radiation at a wavelength that is highly absorptive by said gain material.

45. The solid state microlaser device of claim 44, wherein said rare earth element comprises neodymium.

46. The solid state microlaser device of claim 44, wherein said uniaxial crystal comprises Nd:YVO$_4$.

47. The solid state microlaser device of claim 39, wherein said nonlinear crystal is oriented with respect to said solid state gain material for Type I phase matching.

48. The solid state microlaser device of claim 39, wherein said nonlinear crystal is oriented with respect to said solid state gain material for Type II phase matching.

49. The solid state laser device of claim 39, wherein said nonlinear crystal is oriented with respect to said solid state gain material to provide sum frequency mixing.

50. The solid state laser device of claim 39, wherein said nonlinear crystal is oriented with respect to said solid state gain material to provide difference frequency mixing.

* * * * *